United States Patent [19]
Ide et al.

[11] Patent Number: 5,344,689
[45] Date of Patent: Sep. 6, 1994

[54] CARBON FIBER PREPREG AND CARBON FIBER REINFORCED RESIN COMPOSITE

[75] Inventors: Shouaki Ide; Akira Shimamoto; Toshiaki Yutori; Masahiko Uchimura, all of Kobe, Japan

[73] Assignee: Kabushiki Kaisha Kobe Seiko Sho, Kobe, Japan

[21] Appl. No.: 30,264

[22] PCT Filed: May 25, 1992

[86] PCT No.: PCT/JP92/00676

§ 371 Date: Apr. 5, 1993

§ 102(e) Date: Apr. 5, 1993

[87] PCT Pub. No.: WO93/03087

PCT Pub. Date: Feb. 18, 1993

[30] Foreign Application Priority Data

Aug. 9, 1991 [JP] Japan .................. 3-224779

[51] Int. Cl.$^5$ .............................. B32B 5/12
[52] U.S. Cl. ................... 428/114; 428/284; 428/285; 428/292; 428/294; 428/297; 428/298; 428/303; 428/408; 428/902
[58] Field of Search ............. 428/284, 294, 298, 408, 428/114, 285, 292, 297, 902, 303

[56] References Cited

U.S. PATENT DOCUMENTS

| | | | |
|---|---|---|---|
| 5,116,668 | 5/1992 | Yamamoto et al. | 428/294 |
| 5,141,570 | 8/1992 | Yutori et al. | 148/320 |
| 5,208,090 | 5/1993 | Okitsu et al. | 428/294 |
| 5,217,770 | 6/1993 | Morris et al. | 428/294 |

FOREIGN PATENT DOCUMENTS

| | | | |
|---|---|---|---|
| 2199439 | 9/1987 | Japan | 428/294 |
| 3-52754 | 3/1991 | Japan . | |

*Primary Examiner*—James J. Bell
*Attorney, Agent, or Firm*—Oblon, Spivak, McClelland, Maier & Neustadt

[57] ABSTRACT

A carbon fiber prepreg comprising a unit layer consisting of carbon fibers and a matrix resin layer, and stranded filaments or single filaments incorporated thereinto. The steel fiber is an Ni plated low-carbon dual-phase steel filament and has a filament diameter of not more than 100 μm, a tensile strength of 300 to 700 kgf/mm$^2$, and an area reduction at fracture of more than 20%. The carbon fibers and steel filaments are aligned codirectionally, and the steel fiber content of the prepreg relative to the carbon fiber is not more than 10 vol %. Sheets of the carbon fiber prepreg are laminated to form a carbon fiber reinforced composite.

12 Claims, 6 Drawing Sheets

1st ~ 6th layers
7th layer
8th layer
9th layer
10th, 11th layers ↑ Impact

FIG. 10

CARBON FIBER PREPREG AND CARBON FIBER REINFORCED RESIN COMPOSITE

TECHNICAL FIELD

The present invention relates to a prepreg comprising a matrix resin layer and carbon fibers oriented unidirectionally therein, and a carbon-fiber reinforced resin material made of laminated layers of such a prepreg. More particularly, the invention relates to a prepreg and/or resin material of the type which has excellent strength and elasticity characteristics and yet provides improved impact resistance and toughness, and which provides improved wettability and adhesivity relative to the matrix resin, thus enhancing its quality reliability.

BACKGROUND ART

Carbon-fiber reinforced plastics (hereinafter referred to as CFRP) have good advantages over other fiber reinforced plastics in mechanical characteristics, such as strength, modulus of elasticity, and lightness. For this reason, CFRP has found use in various applications in such fields as aircraft, spacecraft, sports, and equipment for leisure time amusement, and indeed the demand therefor is on the increase. Conventionally, however, CFRP has a drawback that it is not well qualified in respect of impact resistance and toughness, though it has high strength and high modulus of elasticity. As such, improvement in this respect is required in order that CFRP may be found satisfactory for use as a structural material for aircrafts and the like.

In order to overcome such a drawback of CFRP in respect of impact resistance and toughness, there have been developed hybrid plastics comprising carbon and aramid fibers. Also, as described in Japanese Patent Laid-Open Publication No. SHO 58-90943, there has been proposed a fiber reinforced composite material comprising carbon fiber and aromatic polyamide fiber.

However, with the known hybrid plastics, one problem is that in order to obtain improved toughness and impact resistance, the hybrid plastic must contain a considerably large amount of aramid fiber, which may adversely affect the elastic property feature which is characteristic of carbon fiber. Another problem is that the aramid fiber component exhibits poor performance in respect of wettability and adhesivity relative to the matrix resin, which fact may easily affect the rigidity and strength characteristics of the hybrid plastic, thus lowering the quality reliability of the plastic.

In the above cited Japanese Patent Laid-Open Publication No. SHO 58-90943, it is stated that the fiber reinforced composite material comprising carbon and aromatic polyamide fibers utilizes respective advantages of the two kinds of fibers, whereby respective shortcomings of the two fibers, i.e., insufficient impact resistance of the carbon fiber and low elasticity modulus of the aramid fiber, can be satisfactorily overcome, and more particularly improvement can be obtained in impact resistance and in adhesion property relative to the matrix resin, over "KEVLAR" (Registered trademark of Du Pont), a typical aramid fiber. However, this fiber reinforced composite material still has a problem in that its mechanical characteristics, such as strength, elasticity modulus, and impact resistance, are insufficient for use in the above mentioned applications, and improvement in this respect has been demanded.

It is a primary object of the invention to provide a carbon fiber prepreg and a carbon fiber reinforced material made from the prepreg which provide improved impact resistance and toughness and improved wettability and adhesivity relative to the matrix resin, without detriment to the outstanding characteristics of the carbon fiber component, and which can thus exhibit improved quality reliability and meet the foregoing demand in respect of all the performance characteristics required of fiber reinforced materials in general.

DISCLOSURE OF THE INVENTION

According to one aspect of the invention, as claimed in claim 1, there is provided a carbon fiber prepreg comprising a unit layer consisting of a matrix resin layer and carbon fibers unidirectionally buried therein, and stranded filaments formed from steel fibers having a filament diameter of not more than 100 $\mu$m, a tensile strength of 300 to 700 kgf/mm$^2$, and an area reduction at fracture of more than 20% which are mixed with the carbon fibers codirectionally with the carbon fibers so that the steel fiber content of the prepreg relative to the carbon fibers is not more than 10 vol %.

In its second aspect, as claimed in claim 2, the invention provides a carbon fiber prepreg wherein single filaments of the steel fiber defined in claim 1 are mixed with the carbon fibers codirectionally therewith in such a way that they are evenly and finely dispersed.

The invention, in another aspect thereof as claimed in claim 3, provides a carbon fiber reinforced resin composite comprising layers of the carbon fiber prepreg as defined in claim 1 or 2 which are laminated together. In a further aspect of the invention, as claimed in claim 4, the steel fibers are plated. In another aspect of the invention as claimed in claim 5, the steel fibers are of a low-carbon dual-phase steel. In another aspect of the invention, as claimed in claim 6, the plating applied to the steel fibers is Ni plating.

The prepregs of the invention include one having carbon and steel fibers separately arranged within the matrix resin layer, and one having pre-doubled filaments of the two kinds of fibers arranged within the matrix resin layer.

The steel filaments may be arranged in mixture with the carbon fibers, either within the unit layer comprising the carbon fibers and the matrix resin layer or between such unit layers. It is to be noted, however, that where the steel filaments are arranged between unit layers, uneven stress is likely to develop between the unit layers, with the result that the effect of the prepreg may be reduced. Therefore, it is preferred that the steel filaments should be arranged within the unit layer. The steel filaments may be arranged either equidistantly or randomly.

Stranded filaments that may be used in the present invention include not only those formed by twisting a plurality of steel filaments twisted together, but also so-called doubled steel fiber yarns. For the steel fibers, not only low-carbon dual-phase steel filaments, but also piano wires and stainless steel filaments may be used. The term "low-carbon dual-phase steel filament" referred to herein means a steel filament, earlier proposed by the present applicant, which is produced by subjecting a wire rod of 0.01 to 0.50 mm in diameter which contains, in terms of wt %, 0.01 to 0.50% of C, not more than 3.0% of Si, and not more than 5.0% of Mn, with the rest consisting of Fe and unavoidable impurities, to a primary heat treatment, a primary cold drawing, a secondary heat treatment, and a secondary cold drawing so that the wire rod is forcedly worked for wire diameter reduction to not more than 100 μm (see Japanese Patent Laid-Open Publication No. SHO 62-20824). A low-carbon dual-phase steel filament produced according to the above described method has a fibrous fine metal texture in which cells worked by such forced working are unidirectionally fibrously oriented such that the size of worked cells is of the order of 5 to 100 Å, with an interfiber spacing of 50 to 1000 Å, the steel filament having a tensile strength of more than 300 kgf/mm$^2$. Where such a low-carbon dual-phase steel filament as a metal fiber component, addition of the steel filament in a very small amount provides increased fiber elongation at break and can substantially improve the impact resistance of the prepreg.

For the matrix resin of the invention, thermosetting resins, such as epoxy resin and phenolic resin, and thermoplastic resins, such as polyester and polyamide, may be used.

The reinforcing mechanism of the invention will now be explained. The strength of a composite material is generally expressed as follows:

Composite material strength=reinforced material strength×vol % +matrix strength×vol % That is, the strength of the composite material depends on the strength and volume percentage of the reinforcing material, and accordingly the higher the strength of the reinforcing material, the smaller is the volume percentage of the reinforcing material.

Where reinforcing materials, such as conventional KEVLAR and aramid fibers, are used, in order to increase the strength of the composite material by a few percent, it is necessary that these fibers must be added on the order of a few percent correspondingly. In other words, unless a corresponding vol % of fibers is added, no strength increase is obtainable. This is a negative factor from the standpoint of weight reduction. In contrast, the steel fiber used in the invention has the advantage that only 1% addition of same results in 20% increase in strength and addition of only about 0.5% results in a strength increase of the order of 10%. Such high increase in strength is unconceivable from what is commonly known with conventional composite materials. Furthermore, use of the steel fiber can result in a very noticeable improvement in fracture toughness (Charpy impact strength), the insufficiency of which characteristic has been a fatal drawback of conventional carbon fiber prepregs and/or reinforced resin materials.

This is a unique advantage of the present invention which cannot be explained merely by the foregoing principle of strength improvement. When a large external force is applied on any conventional CFRP, fracture is caused to carbon fiber components which are inherently fragile and the fracture, mainly in the form of a resin crack, propagates in a direction perpendicular to the carbon fiber, which eventually leads to composite material fracture. In contrast, in the prepreg of the present invention the presence of steel fibers having aforementioned characteristics helps stop the propagation of cracking; or the toughness and strength of the steel fibers per se serve to prevent the fracture of carbon fibers per se. It is believed that such resisting behavior of the steel fibers contributes toward overall strength improvement. Therefore, the term "steel fiber" referred to herein means a steel fiber which must have good toughness in itself and which has an area reduction at fracture of more than 20%, preferably more than 50%. For example, a low-carbon dual-phase steel filament, a piano wire, or a stainless steel filament, as indicated in Table 2, may be used as such. High strength alone of the steel fiber may contribute toward weight reduction, but unless it also has good toughness, the steel fiber does not serve to prevent the fracture of the carbon fiber component, it being thus impracticable to obtain such outstanding fracture toughness of the prepreg of the invention. KEVLAR and aramid fibers, for example, have a toughness of the order of 5% in terms of at-fracture reduction of area, which cannot give any such good effect. The same is true with other metal filaments, such as tungsten and titanium.

BEST MODE FOR CARRYING OUT THE INVENTION

Embodiments of the invention will now be described with reference to the accompanying drawings.

First Embodiment

Figure 1:
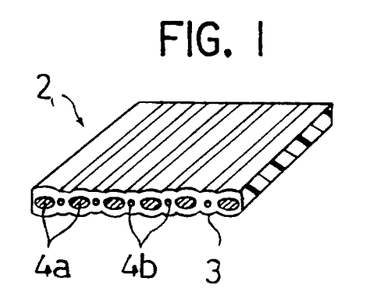
FIG. 1 is a perspective view for explanation of a carbon fiber prepreg representing a first embodiment according to one aspect of the invention as claimed in claim 1.
Figure 2:
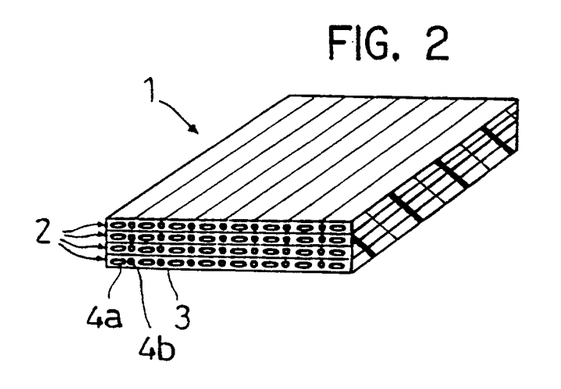
FIG. 2 is a perspective view showing a carbon-fiber reinforced resin composite made of the carbon fiber prepreg of the first embodiment.
Figure 3A:
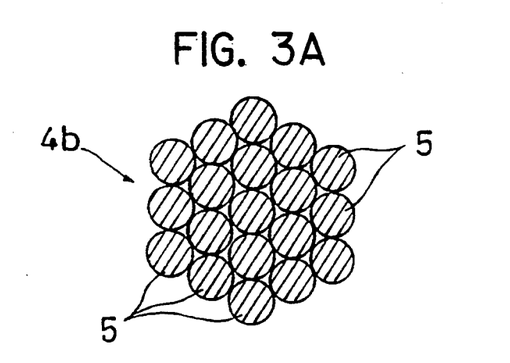
FIG. 3 is a sectional view showing steel fibers and a stranded filament in the first embodiment.
Figure 3B:
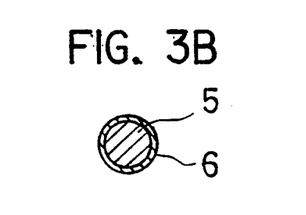

FIGS. 1 through 3 are views for explaining a carbon fiber prepreg and a carbon-fiber reinforced resin material made therefrom, both representing the first embodiment according to one aspect of the invention as claimed in claim 1.

In the drawings, the reference numeral 1 designates a carbon-fiber reinforced resin composite which is a laminate formed by laminating a plurality of layers of a carbon fiber prepreg 2 and heating and hardening the same.

The carbon fiber prepreg 2 comprises stranded filaments 4b formed by twisting a plurality of carbon fiber stranded filaments 4a and ten-odd steel fiber filaments 5 together, and a matrix resin layer 3 in which are buried the stranded filaments at predetermined intervals. The carbon fiber stranded filaments 4a and steel fiber stranded filaments 4b are codirectionally oriented within the prepreg 2, and the carbon-fiber reinforced resin composite 1 consists of layers of such carbon fiber prepreg 2 which are laminated in such a way that the carbon fiber stranded filaments 4a and steel fiber stranded filaments 4b in respective layers are codirectionally oriented, the steel fiber 5 content of the resin composite 1 being 0.5 to 10 vol % relative to the carbon fiber content.

The steel fiber 5 is a low-carbon dual-phase steel fiber filament of 10 to 40 μm in diameter having the above described composition and produced according to the above described method. Therefore, the low-carbon dual-phase steel fiber filament has a fibrous fine texture in which cells worked through the above described forced working are unidirectionally fibrously arranged. The size of the worked cells and the spacing between adjacent filaments are of the order of 5 to 100 Å and 50 to 1000 Å respectively. Further, the steel fiber filament has a tensile strength of 300 to 700 $kgf/mm^2$, an elasticity modulus of 15 to 25 $ton/mm^2$, and an elongation of 2 to 5%. An Ni plated layer 6 is formed on the outer surface of the steel fiber 5. The Ni plated layer is formed by plating the above mentioned wire rod and has a deformation that has been created by plastic working carried out simultaneously as the wire rod was subjected to cold wire drawing.

The method employed in fabricating the carbon fiber prepreg 2 and carbon fiber reinforced resin material 1 will now be described.

Figure 4A:
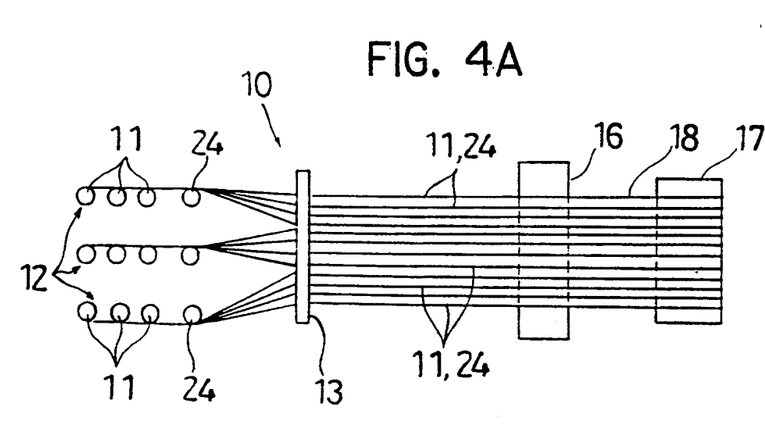
FIG. 4 is a schematic view showing an apparatus for production of the carbon fiber prepreg of the first embodiment.
Figure 4B:
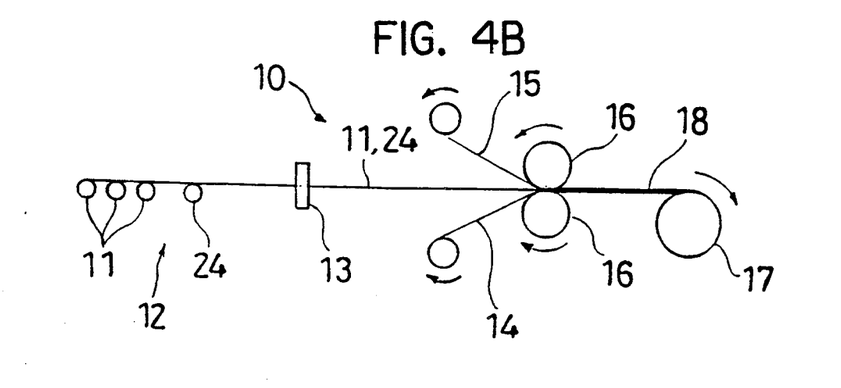

FIGS. 4 (a) and 4 (b) are schematic views showing an apparatus for fabricating a carbon fiber prepreg 2. The apparatus 10 comprises three sets of creels 12 for separately feeding strands of a carbon fiber yarn (carbon fiber stranded filament) 11 formed from a multiplicity of carbon fibers stranded together and strands of a steel fiber yarn (steel fiber stranded filament) 24 formed from a plurality of steel fibers stranded together, a slit station 12 for uniformly orienting strands of carbon fiber yarn 11 supplied from respective creels 12 and for arranging strands of steel fiber yarn 24 at predetermined intervals, a pair of rolls 16, 16 for thermocompression bonding of release paper 14 and release film 15, both coated with epoxy resin, onto carbon fiber yarn 11 and steel fiber yarn 24, and a drum 17 for taking up a carbon fiber prepreg 18 thus formed.

In producing a carbon fiber prepreg 2 by using the apparatus 10, carbon fiber yarn 11 and steel fiber yarn 24 are separately fed from respective creels 12, and strands of the carbon fiber and steel fiber yarns 11 and 12 are evenly aligned. Then, release paper 14 is thermocompression bonded to the underside of both yarns 11 12 and release film 15 is likewise bonded to the upper surface thereof, whereby a prepreg sheet 18 is formed, the prepreg sheet 18 being then wound onto the drum 17.

The prepreg sheet is then cut to a predetermined length for forming a carbon fiber prepreg 2. A predetermined number of layers of the prepreg is laminated to form a laminate. Subsequently, the laminate is heated and hardened, whereby a carbon fiber reinforced resin composite 1 is produced.

The method for such fabrication is not limited to the above described one in which carbon fiber yarn 11 and steel fiber yarn 24 are separately supplied. A single form of yarn strand comprising the two fiber yarns 11, 24 stranded in a doubled fashion may be supplied and arranged on release paper 14, or such form of yarn strand may be continuously wound onto a drum in a wet process using organic solvent.

In this way, the present embodiment is of such arrangement that carbon fiber stranded filaments 4a and steel fiber stranded filaments 4b are buried in a matrix resin layer 3 in which they are codirectionally oriented. According to this arrangement, it is possible to improve the impact resistance and toughness of the prepreg 2 by virtue of the steel fiber 5 while preserving the high strength and high elasticity characteristics of the carbon fiber, and further to strikingly improve the strength of the carbon fiber stranded filaments 4a and steel fiber stranded filaments 4b against axial tension, bending force and so on. A plurality of such carbon fiber prepregs 2 are superposed to form a carbon fiber reinforced resin composite 1. The resin composite can therefore be successfully employed for use as a structural material for aircrafts and the like, which area of application has hitherto been found difficult for entry, it being thus possible to meet the aforementioned demand.

In the present embodiment, for the steel fiber 5 is employed a low-carbon dual-phase steel filament. This provides for further improvement in all the required mechanical characteristics, such as tensile strength, elasticity, and elongation. Furthermore, an Ni plated cover layer 6 is formed on the low-carbon dual-phase steel filament, which can result in improvement in the adhesivity and wettability of the steel filament relative to the matrix resin layer 3 and thus in improved quality dependability.

Furthermore, the present embodiment can minimize the quantity of steel fiber stranded filament 4b contained in the carbon fiber prepreg 2 and, in turn, reduce such filament content of the resin material 1. Thus, it is possible to enhance hybridization without detriment to the inherent characteristics of carbon fiber, such as high modulus of elasticity, and to avoid any weight increase inherent in the use of metal fibers, thus coping with the demand for weight reduction.

Experiment 1

An experiment was carried out to ascertain the characteristic enhancing effect of the carbon fiber reinforced resin composite of the present embodiment, which experiment will be explained below. In the experiment, two types of embodiment samples 1, 2 were prepared according to the fabrication procedures employed for the present embodiment. Also, three types of reference samples 1-3. Measurement was made with these samples in respect of tensile strength, tensile modulus of elasticity, elongation at rupture, bending strength, and Charpy impact strength, and measurements obtained with respect to respective samples were compared.

A carbon fiber prepreg was prepared according to the above described method of fabrication and by using a carbon fiber yarn formed of 6000 filaments and a steel fiber yarn formed of 8 filaments. For the epoxy resin was used a mixture of epichlorohydrin-bisphenol A type liquid resin, solid resin of same type, and phenolic novolak type liquid resin, and for the hardening agent were used dicyandiamide (DICY) and 3-(P-chlorophenyl)-1,1-dimethyl urea (DCMU) in combination. A predetermined number of aforesaid carbon fiber prepregs was laminated, and the laminate was subjected to heating and hardening in a compression molding machine under the conditions of 130° C.×2 hr and 8 $kg/cm^2$, whereby a carbon fiber reinforced plastic was produced (Embodiment Sample 1).

Another carbon fiber reinforced plastic was produced according to the same method of fabrication and under the same conditions, except that the number of filaments in the steel fiber yarn was 18 (Embodiment Sample 2).

Nextly, for purposes of comparison, a carbon fiber yarn of 6000 filaments and a steel fiber yarn of 8 filaments were woven into a fabric (of plain weave) so that the unit number of warp and weft yarns was 9/25 mm. The fabric was treated in a wet process wherein it was steeped in the above mentioned resin which was diluted with solvent. Thereafter, the fabric was heated and formed into a carbon fiber prepreg. Plural sheets of the prepreg were laminated, and the laminate was subjected to compression molding under the same conditions as above, whereby a carbon fiber reinforced plastic was produced (Reference Sample 1). By using aramid fiber yarn (of 50 filaments; of same volume as metal fiber yarn) in place of the steel fiber yarn, an aramid fiber hybrid carbon fiber reinforced plastic was produced in same manner as the method employed in making Embodiment Sample 1 (Reference Sample 2). In addition, a carbon fiber reinforced plastic comprising carbon fiber alone was prepared (Reference Sample 3).

Table 1 shows the results of measurements made with respect to these samples. The first column of the table gives steel fiber of aramid fiber content relative to the carbon fiber.

As is apparent from the table, Reference Sample 1 which incorporates steel fiber as a yarn component of a woven fabric exhibits good workability, but all its mechanical characteristics are found very low. Reference Samples 2, 3 are found satisfactory in elastic modulus in tension, at 1.15 and 1.22 GPa respectively; in bending strength, at 1420 and 1513 MPa respectively; and in bending modulus of elasticity, at 1.06 and 1.18 GPa. However, measurements with respect to these samples were found unsatisfactory in tensile strength at 1230 and 1201 MPa respectively; in elongation at rupture at 0.92% and 0.89% respectively; and in Charpy impact strength at 0.93 and 0.90 kgfm/cm$^2$. In contrast, measurements with respect to Embodiment Samples 1 and 2 indicate that the samples are satisfactory in tensile modulus in tension, at 1.23 and 1.23 GPa respectively; in bending strength, at 1514 and 1543 MPa respectively; and in bending modulus of elasticity, at 1.81 and 1.10 GPa respectively. Further, remarkable improvement is witnessed in tensile strength, at 1469 and 1540 MPa; in elongation at rupture, at 1.09% and 1.10% respectively; and in Charpy impact strength, at 1.13 and 1.21 kgfm/cm$^2$. It an be seen from these results that unidirectional hybridization of steel fiber provides for well balanced improvement in various mechanical characteristics without detriment to the inherent characteristics of carbon fiber and through a slight addition of steel fiber.

Table 3 gives Charpy impact test values, and mean values of same, measured at Charpy impact tests conducted with respect to reference sample pieces which comprise carbon fiber alone, and embodiment sample pieces containing low-carbon dual-phase steel fiber stranded filaments (of about 1 vol %). As is clearly seen from the table, whereas in the case of reference sample pieces containing carbon fiber alone, mean value is registered at 0.95 kgfm/cm$^2$, the mean value with respect to the embodiment sample pieces is registered at 1.02 kgfm/cm$^2$, or an improvement on the order of 7%.

Figure 5:
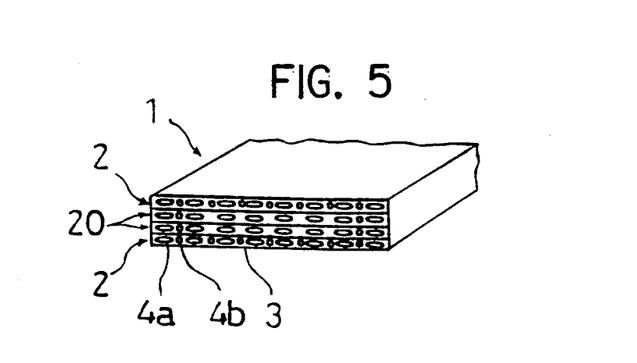
FIG. 5 is a perspective view showing a modified form of the first embodiment.
Figure 6:
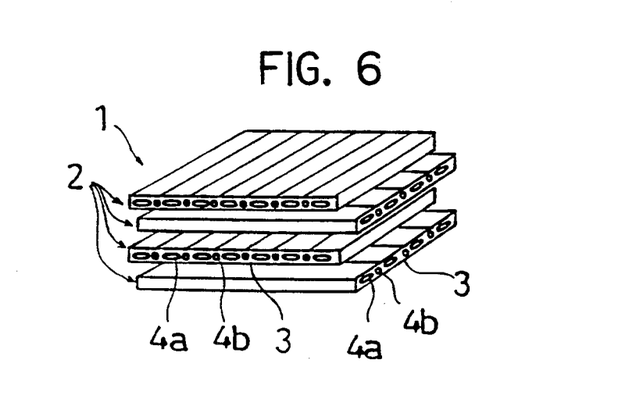
FIG. 6 is a perspective view showing another modified form of the first embodiment.

Various forms of steel fiber arrangement may be used. For example, as shown in FIG. 5, outer surface portions only may be reinforced with steel fiber stranded filaments 4b, with carbon fiber stranded filaments 4a arranged only in interior portions. This can be achieved by laminating together prepregs 2 having stranded filaments 4b arranged throughout the entirety thereof and prepregs 20 having such filaments arranged at opposite side portions thereof. For the directions in which carbon fiber prepregs are laminated, various forms of lamination may be employed. For example, as FIG. 6 shows, lamination may be carried out in such a way that directions of fiber orientation are orthogonal to each other or intersect at an angle.

Embodiment 2

Figure 7:
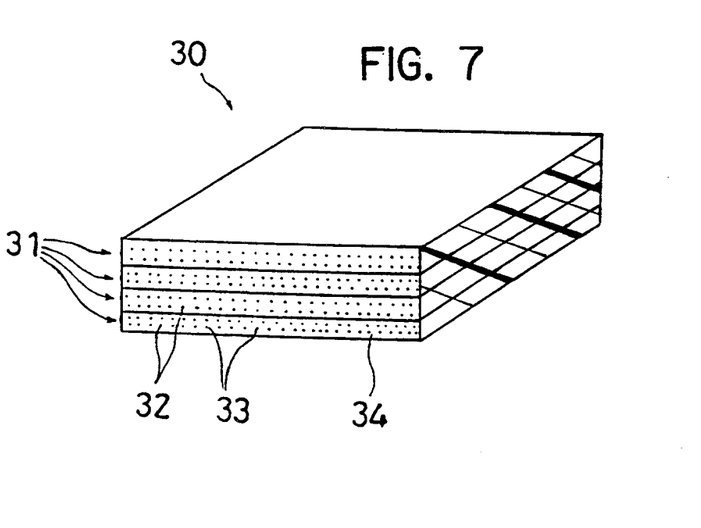
FIG. 7 is a perspective view for explaining layers of a carbon fiber prepreg, and also of a carbon-fiber reinforced resin composite, representing a second embodiment according to another aspect of the invention as claimed in claim 2.

FIG. 7 is a view for explaining a carbon fiber prepreg representing a second embodiment of the invention, as claimed in claim 2, and a carbon fiber reinforced resin composite using same.

In the figure, the reference numeral 30 designates a carbon fiber reinforced resin composite which is fabricated by laminating plural sheets of carbon fiber prepreg 31 together and then by heating and hardening the laminate. The carbon fiber prepreg 31 comprises a matrix resin layer 34 and carbon fiber filaments 32 and steel fiber filaments 33 uniformly and finely dispersed within the matrix resin layer in which they are buried. The carbon fiber filaments 32 and steel fiber filaments 33 are codirectionally arranged, and the steel fiber 33 content of the carbon fiber reinforced resin composite 30 is 0.5 to 10 vol % relative to the carbon fiber 32. Further, for the steel fiber component 33 is used a low-carbon dual-phase steel fiber filament having an Ni plated surface.

In the present embodiment, steel fiber filaments 33 are buried within the matrix resin layer 34, with the filaments uniformly and finely dispersed therein. According to such arrangement, it is possible to efficiently improve the impact resistance and toughness of the carbon fiber reinforced resin material while preserving the high strength and high elasticity characteristics, and also to provide for characteristic equalization. For reference, it is noted that where stranded filaments are buried in spaced apart relation as in the embodiment representing a first aspect of the invention, as claimed in claim 1, the average value of such characteristics as impact resistance and toughness can be improved when the characteristics are viewed as a whole, but locally there are portions in which steel fiber is not present and no characteristic improvement has occurred with respect to such local portions, which fact presents a limitation from the standpoint of characteristic equalization. In view of this fact, the present embodiment is of such arrangement that steel fiber filaments are evenly and finely distributed so that characteristic equalization may be easily achieved. Depending upon the application and the effect of the load applied, there may be cases where only a certain local portion should be characteristically improved. In the present embodiment, steel fiber filaments are arranged in a portion or portions which require characteristic improvement. It is thus possible to provide efficient improvement in the required characteristics and eventually to contribute to weight reduction.

Experiment 2

Figure 9:
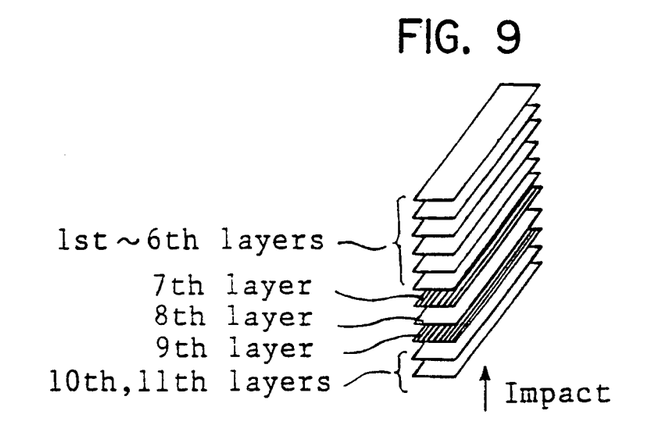
FIG. 9 is an exploded view in perspective showing test pieces used in a test conducted in ascertaining the performance effect of the second embodiment.

Impact tests were carried out to ascertain the effect of the carbon fiber reinforced resin composite of this second embodiment, which tests will be explained below. In these tests, as FIG. 9 shows, first to sixth, eighth, tenth, and eleventh unit layers containing carbon fibers only, and seventh and ninth unit layers having low-carbon dual-phase steel filaments uniformly and finely distributed therein, were sequentially laminated to form test specimens of 10 mm width×1.6 mm thickness×80 mm length each which represent the present embodiment. Impact strength was measured with respect to each specimen, where the specimen had a low-carbon dual-phase steel filament content of 1.4 vol %, the filament diameter being 50 μm one case and 100 μm in another case (specimen Nos. ②-1, ②-2); and where the specimen had such a content of 2.8 vol %, the filament diameter being 50 μm in one case and 100 μm in another case specimen Nos. ③-3, ③-2) as shown in Table 4. For purposes of comparison, measurement was made likewise with respect to a conventional test specimen consisting of first to eleventh unit layers (specimen No. ①). Impact tests were carried out employing a Charpy impact tester (5 kgf.m) and according to the flatwise impact test procedure, with a hammer lifting angle set at 90 degrees (2.5 m/S) and an interspan distance set at 60 mm. Impact was applied from the eleventh layer side.

Figure 10:
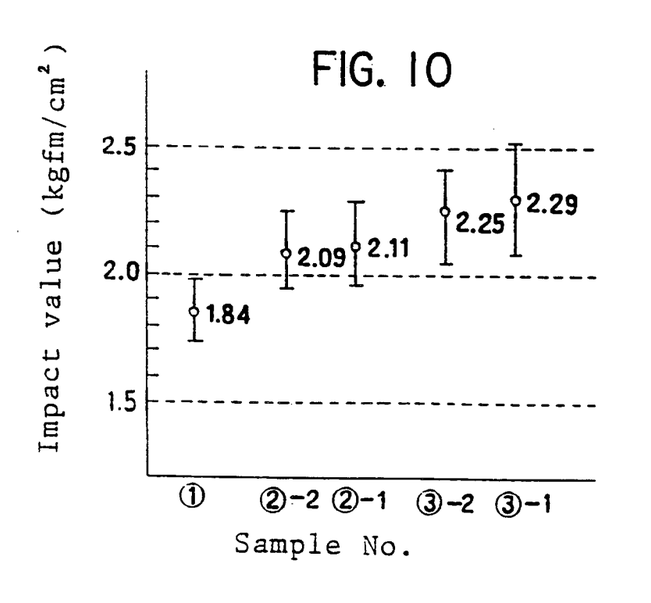
FIG. 10 is a characteristic view showing the results of the tests conducted with respect to the second embodiment.

As is apparent from Table 4 and FIG. 10, with conventional specimen (No. ①), impact values are registered at 1.74 to 1.98 kgfm/cm², averaging at 1.84 kgfm/cm². In contrast, with embodiment specimens ("SCIFER"; Registered trademark in Japan;Nos. ②-1, ②-2, ③-1, ③-2), impact values averaged at 2.09 to 2.29 kgfm/cm², or an improvement of 14 to 24% over the conventional specimen. According to the results of the tests, the greater the low-carbon dual-phase steel filament content, the higher is the impact value, and further improvement is seen as compared with the case where stranded filaments are buried in the matrix resin layer.

Figure 8:
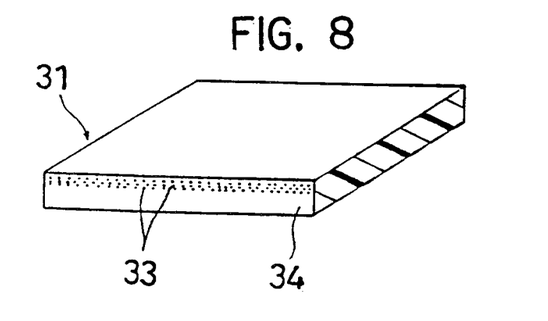
FIG. 8 is a perspective view showing a modified form of the second embodiment.

The form of steel fiber arrangement may be varied in different ways. For example, as shown in FIG. 8, only surface portions on which impact load is likely to be applied may be reinforced with steel fiber 33, with only carbon fiber arranged in the interior portion. Where such arrangement is used, further weight reduction can be achieved while improvement is obtained in impact resistance.

INDUSTRIAL APPLICABILITY

As described above, according to the first aspect of the invention, as claimed in claim 1, the carbon fiber prepreg comprises a unit layer consisting of carbon fibers and a matrix resin layer, and steel fiber stranded filaments (including yarn strands) mixed with the carbon fibers and arranged codirectionally therewith in the unit layer. Therefore, the prepreg provides improved impact resistance and toughness by virtue of the steel fiber component while preserving high strength and high elasticity characteristics inherent to the carbon fiber component. Further, noticeable improvement can be achieved in the strength characteristics, such as tensile and bending strength, in the axial direction of the carbon and steel fibers. Thus, it is possible to satisfy all of the mechanical characteristics required of a carbon fiber reinforced composite material. Such outstanding characteristics can be obtained merely through addition of such steel fiber in a slight amount, i.e., not more than 10 vol %. Therefore, it is no longer necessary to add a large quantity of, for example, aramid fiber as has been the case in the past. Thus, it is now possible to achieve hybridization without detriment to the inherent characteristics of carbon fiber, such as high elasticity, and to avoid the trouble of weight increase which has hitherto been encountered in the case of metal fibers being used. This contributes to weight reduction. Further, aforesaid steel fiber exhibits good wettability and good adhesivity relative to the matrix resin, which makes it possible to avoid possible decrease in rigidity and strength and thus to enhance quality reliability.

According to the second aspect of the invention, as claimed in claim 2, steel fiber filaments are incorporated into the matrix resin layer in codirectional relation with carbon fiber filaments. This arrangement, as well as the claim 1 arrangement, provides good improvement in all of the required mechanical characteristics. In this case, the steel fiber is in the form of single filaments dispersed in a uniform and minute manner. This leads to characteristic equalization. It is also possible to incorporate steel fiber into only those portions which require characteristic improvement, which fact permits efficient improvement in the required characteristics and eventually contributes to weight reduction. Further, since steel fiber filaments are arranged in a uniform and minute fashion, it is possible to positively arrest the propagation of any crack. This can enhance overall strength improvement. In the arrangement as claimed in claim 3, sheets of above described carbon fiber prepreg are laminated together to form a carbon fiber reinforced resin composite. This composite can satisfy all the characteristic requirements of, for example, a structural component for aircrafts, when it is adopted for use in such application, and can thus meet the foregoing demand. In the arrangement as claimed in claim 4, the steel fiber filament is plated, and particularly where Ni plating is applied as set forth in claim 6, such plating serves to further improve the wettability and adhesivity of the filament surface relative to the matrix resin. Further, this lends itself to inhibition of filament activity in the case where a steel fiber filament having a diameter of not more than 100 μm, and serves to improve the self-lubricating property and corrosion resistance of the filament.

In the arrangement as claimed in claim 5, the low-carbon dual-phase steel fiber filament used as the steel fiber component has good cold workability and can therefore be easily worked to a filament of not more than 100 μm by suitably selecting the diameter of the wire rod to be worked and the degree of working. Further, as described earlier with respect to the reinforcing mechanism associated with the invention, the steel fiber filament has excellent characteristics, such as tensile strength, elasticity, elongation and toughness. Therefore, the use of such low-carbon dual-phase steel filament leads to further improvement in the required mechanical characteristics.

TABLE 1

|  | Embodiment Sample 1 | Embodiment Sample 2 | Reference Sample 1 | Reference Sample 2 | Reference Sample 3 |
| --- | --- | --- | --- | --- | --- |
| Fiber content (vol %) | 65.7 | 65.1 | 64.5 | 63.8 | 64.3 |
| Steel fiber or aramid fiber content relative to | 1.1 | 4.0 | 1.1 | 1.1 | 0 |

TABLE 1-continued

| | Embodiment Sample 1 | Embodiment Sample 2 | Reference Sample 1 | Reference Sample 2 | Reference Sample 3 |
| --- | --- | --- | --- | --- | --- |
| carbon fiber (vol %) | | | | | |
| Tensile strength (MPa) | 1469 | 1540 | 487 | 1230 | 1201 |
| Modulus in tension (GPa) | 1.23 | 1.23 | 0.63 | 1.15 | 1.22 |
| Elongation at rupture (%) | 1.09 | 1.10 | — | 0.92 | 0.89 |
| Bending strength (MPa) | 1514 | 1543 | 822 | 1420 | 1513 |
| Modulus in bending (GPa) | 1.18 | 1.10 | 0.48 | 1.06 | 1.18 |
| Charpy impact strength (kgfm/cm$^2$) | 1.13 | 1.21 | 0.58 | 0.93 | 0.90 |

TABLE 2

| Kind | Density (g/cm$^2$) | Filament Diameter (μm) | Tensile Strength (kgf/mm$^2$) | Modulus of Elasticity (kgf/mm$^2$) | Elongation (%) | Reduction of Area at fracture (%) |
| --- | --- | --- | --- | --- | --- | --- |
| Low-carbon | 7.8 | 20 | 515 | 20000 | 3.9 | 47 |
| dual-phase steel | 7.8 | 30 | 475 | 20000 | 4.0 | 53 |
| (superfine metal) | 7.8 | 50 | 425 | 20000 | 4.2 | 57 |
| (Fe—C—Si—Mn) | 7.8 | 100 | 400 | 20000 | 4.5 | 55 |
| Piano wire (82C) | 7.8 | 100 | 310 | 20000 | 3.2 | 51 |
| Stainless steel wire (SUS 304) | 7.8 | 50 | 270 | 18000 | 3.2 | 60 |

TABLE 3

| Test specimen | Impact Value (kgfm/cm$^2$) | | |
| --- | --- | --- | --- |
| | Test Value | Mean Value | C.V (%) |
| CFRP | 0.95 | 0.95 | 10.2 |
| | 0.92 | | |
| | 0.99 | | |
| | 1.03 | | |
| | 1.09 | | |
| | 1.01 | | |
| | 0.82 | | |
| | 0.79 | | |
| Low-carbon dual-phase steel fiber filament (1 V %)/CFRP | 1.10 | 1.02 | — |
| | 1.05 | | |
| | 0.95 | | |
| | 0.99 | | |
| | 1.01 | | |
| | 1.02 | | |
| | 1.07 | | |
| | 0.98 | | |

TABLE 4

| Sample No. | 1st–6th layer (CF only) | | 7th · 9th layer (CF + low-carbon dual-phase steel fiber filament) | | | | |
| --- | --- | --- | --- | --- | --- | --- | --- |
| | CF weight (g/m$^2$) | CF direction | SCIFER weight (g/m$^2$) | CF direction | SCIFER weight (g/m$^2$) | Filament diameter (μm) | pitch (mm) |
| (1) | 150 | ±40° | 200 | 0° | | CF only | |
| (2)-1 | 150 | ±40° | 150 | 0° | 50 | 50 | 0.3 |
| (2)-2 | 150 | ±40° | 150 | 0° | 50 | 100 | 1.2 |
| (3)-1 | 150 | ±40° | 100 | 0° | 100 | 50 | 0.15 |
| (3)-2 | 150 | ±40° | 100 | 0° | 100 | 100 | 0.6 |

| Sample No. | 8th, 9th, 11th layer (CF only) | | Impact Value | | | Increase ratio without SCIFER (%) | Ratio of SCIFER to CF (V %) |
| --- | --- | --- | --- | --- | --- | --- | --- |
| | CF weight (g/m$^2$) | CF direction | MIN | MAX | Mean Value | | |
| (1) | 150 | 0° | 1.74 | 1.98 | 1.84 | — | 0 |
| (2)-1 | 150 | 0° | 1.96 | 2.29 | 2.11 | 15 | 1.4 |
| (2)-2 | 150 | 0° | 1.95 | 2.26 | 2.09 | 14 | 1.4 |
| (3)-1 | 150 | 0° | 2.07 | 2.51 | 2.29 | 24 | 2.8 |
| (3)-2 | 150 | 0° | 2.03 | 2.41 | 2.25 | 22 | 2.8 |

What is claimed is:

1. A carbon fiber prepreg comprising a unit layer consisting of unidirectionally aligned carbon fibers and a matrix resin layer, and Stranded filaments individually formed from a plurality of steel filaments twisted together and having a filament diameter of 100 μm or less, a tensile strength of 300 to 700 kgf/mm$^2$, and an area reduction at fracture of 20% or more which are incorporated into the unit layer in codirectional relation with the carbon fibers so that the steel fiber content of the prepreg relative to the carbon fibers is 10 vol % or less.

2. A carbon fiber prepreg comprising a unit layer consisting of unidirectionally aligned carbon fibers and a matrix resin layer, and single filaments of the steel fiber having a filament diameter of 100 μm or less, a tensile strength of 300 to 700 kgf/mm$^2$, and an area reduction at fracture of 20% or more which are incorporated into the unit layer in codirectional relation with the carbon fibers so that the steel fiber content of the prepreg relative to the carbon fibers is 10 vol % or less in such a way that they are evenly and finely distributed within the unit layer.

3. A carbon fiber reinforced resin composite wherein sheets of the prepreg defined in claim 1 or 2 are laminated together.

4. A carbon fiber prepreg and/or carbon fiber reinforced resin composite as defined in any one of claims 1 or 2, wherein the steel fibers are plated.

5. A carbon fiber prepreg and/or carbon fiber reinforced resin composite as defined in any one of claims 1 or 2, wherein the steel fiber is a low-carbon dual-phase steel filament.

6. A carbon fiber prepreg and/or carbon fiber reinforced resin composite as defined in claim 4, wherein the plating applied to the steel fibers is Ni plating.

7. A carbon fiber prepreg and/or carbon fiber reinforced resin composite as defined in claim 3, wherein the steel fibers are plated.

8. A carbon fiber prepreg and/or carbon fiber reinforced resin composite as defined in claim 3, wherein the steel fiber is a low-carbon dual-phase steel filament.

9. A carbon fiber prepreg and/or carbon fiber reinforced resin composite as defined in claim 4, wherein the steel fiber is a low-carbon dual-phase steel filament.

10. A carbon fiber prepreg and/or carbon fiber reinforced resin composite as defined in claim 5, wherein the plating applied to the steel fibers is Ni plating.

11. A carbon fiber prepreg and/or carbon fiber reinforced resin composite as defined in claim 8, wherein the plating applied to the steel fibers is Ni plating.

12. A carbon fiber prepreg and/or carbon fiber reinforced resin composite as defined in claim 9, wherein the plating applied to the steel fibers is Ni plating.

* * * * *